(12) United States Patent
Starkweather

(10) Patent No.: US 6,795,147 B1
(45) Date of Patent: Sep. 21, 2004

(54) CONTRAST ENHANCEMENT FOR TRANSMISSIVE DISPLAY SYSTEMS

(75) Inventor: Gary K. Starkweather, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/483,702

(22) Filed: Jan. 14, 2000

(51) Int. Cl.[7] .......................................... G02F 1/1335
(52) U.S. Cl. ................................................ 349/114
(58) Field of Search ........................... 349/113, 114, 349/198, 61; 359/580, 584, 586, 588, 589

(56) References Cited

U.S. PATENT DOCUMENTS

| | | | | |
|---|---|---|---|---|
| 3,837,732 A | * | 9/1974 | Bauer ......................... | 359/798 |
| 3,971,869 A | * | 7/1976 | Gelber et al. ............. | 428/195.1 |
| 5,168,383 A | * | 12/1992 | Iwaki et al. ................. | 349/198 |
| 6,172,725 B1 | * | 1/2001 | Lengyel ....................... | 349/104 |

OTHER PUBLICATIONS

P. Allard et al "An Introduction to Optical Components", Photonics Design & Applications Handbook, Book 3, 44th Edition, pp. H–334—H–340, 1998.*
Optical Coating Laboratory, Inc. "Applications in Imaging, Astronomy, Microscopes and Telephoto Systems", Photonics Design & Applications Handbook, Book 3, 44th Edition, pp. H–360—H–362, 1998.*

* cited by examiner

*Primary Examiner*—Toan Ton
*Assistant Examiner*—Tai Duong
(74) *Attorney, Agent, or Firm*—Woodcock Washburn LLP

(57) ABSTRACT

A transmissive display system with a controllable display cell, such as a liquid crystal display cell, includes a pair of generally non-absorptive, high reflectance, low transmittance optical layers positioned opposite each other across the cell to provide improved image contrast. In one implementation, non-absorptive, high reflectance, low transmittance optical layers may be formed by dielectric coatings on inner surfaces of generally transmissive plates facing the display cell.

11 Claims, 1 Drawing Sheet

CONTRAST ENHANCEMENT FOR TRANSMISSIVE DISPLAY SYSTEMS

FIELD OF THE INVENTION

The present invention relates to transmissive display systems and, in particular, to improving contrast ratios or image contrast in such systems.

BACKGROUND AND SUMMARY OF THE INVENTION

Transmissive display systems include controllable display cells, such as liquid crystal display cells, that impart image information onto light transmitted from a light source. The light passes through the display cell to an analyzer (e.g., a polarizer) that resolves the light into a display image that is provided at a display output.

As is known in the art, transmissive display systems, such as liquid crystal display systems, commonly suffer from relatively low image contrast. Low image contrast limits image clarity and image quality, particularly at low image brightness. In addition, many transmissive display systems, such as liquid crystal display systems, have conventionally suffered from generally low transmissivity that adversely affects image brightness. With image contrast being generally deemed a fixed characteristic, maximization of image brightness is commonly a primary design goal in transmissive display systems.

However, improvements in light source brightness and display cell transmissivity have somewhat improved overall image brightness. To provide improved image contrast,sa transmissive display system according to the present invention includes a pair of generally non-absorptive, high reflectance, low transmittance optical layers positioned opposite each other across the display cell, such as a liquid crystal display cell. In one implementation, the non-absorptive, high reflectance, low transmittance optical layers may be formed by dielectric coatings on inner surfaces of generally transmissive plates (e.g., polarizers) facing the display cell.

An effect of the non-absorptive, high reflectance, low transmittance optical layers is that successive portions of the originally incident light undergoes multiple reflections or passes between the optical layers. A portion of light is transmitted toward the display output with each reflective pass. While the optical layers reduce the overall transmittance of the display system, the cumulative light transmission from the multiple reflective passes provides a significant increase in image contrast. In some applications, such as professional imaging, medical imaging and publishing, adequate image brightness in combination with significantly improved image contrast provides improved imaging capabilities.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
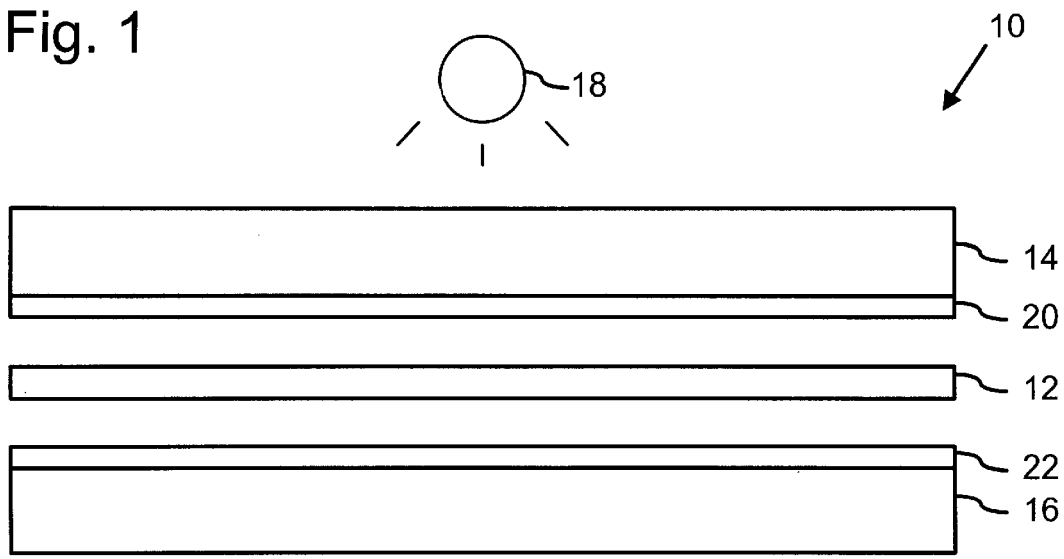
FIG. 1 is an exploded schematic sectional side view of a portion of a transmissive display system with generally non-absorptive, high reflectance, low transmittance optical layers to improve image contrast.

FIG. 1 is an exploded schematic sectional side view of a portion of a transmissive display system 10 having a display cell 12, such as a conventional liquid crystal display cell (e.g., a twisted nematic LCD, an active matrix LCD, a ferroelectric LCD, etc.) or another type of display cell such as those using diffraction techniques like an Eidophor or absorption phenomena such as photochromic technology. Display cell 12 receives display signals and in response to them imparts localized changes in optical characteristics (e.g., phase or polarization) within liquid crystal display cell 12. In the illustrated implementation, liquid crystal display cell 12 is positioned between a pair of polarizers 14 and 16 that cooperate with the localized changes in optical characteristics within liquid crystal display cell 12 to form display images from light received from a light source 18.

As is known in the art, many display cells, including liquid crystal display cells, commonly suffer from relatively low image contrast. Low image contrast limits image clarity and image quality. In addition, liquid crystal displays have conventionally suffered from generally low transmissivity that adversely affect image brightness. As a result, maximization of image brightness is commonly a design goal in transmissive liquid crystal displays. However, improvements in light source brightness and liquid crystal display transmissivity have somewhat improved overall image brightness.

To provide improved image contrast, transmissive display system 10 further includes a pair of generally non-absorptive, high reflectance, low transmittance optical layers 20 and 22 positioned opposite each other across liquid crystal display cell 12. For example, optical layers 20 and 22 with an absorptance of 3% to 5% or less may be considered generally non-absorptive. Accordingly, optical layers 20 and 22 with reflectances of between 90% and 97% or more may be considered high reflectance, and optical layers 20 and 22 with transmittances of between 3% and 10% or less may be considered low transmittance. In one implementation, non-absorptive, high reflectance, low transmittance optical layers 20 and 22 may be formed by dielectric coatings (e.g., multi-layer dielectric coatings) on inner surfaces of generally transmissive plates (e.g., polarizers 14 and 16) adjacent display cell 12. In one implementation, optical layers 20 and 22 are positioned immediately adjacent cell 12 so that maximum contrast effects coupled with image sharpness are maintained. In implementations in which optical coatings include multi-layer dielectric coatings, it will be appreciated that such coatings may be selectively reflective for monochromatic or polychromatic light according to the display application.

Figure 2:
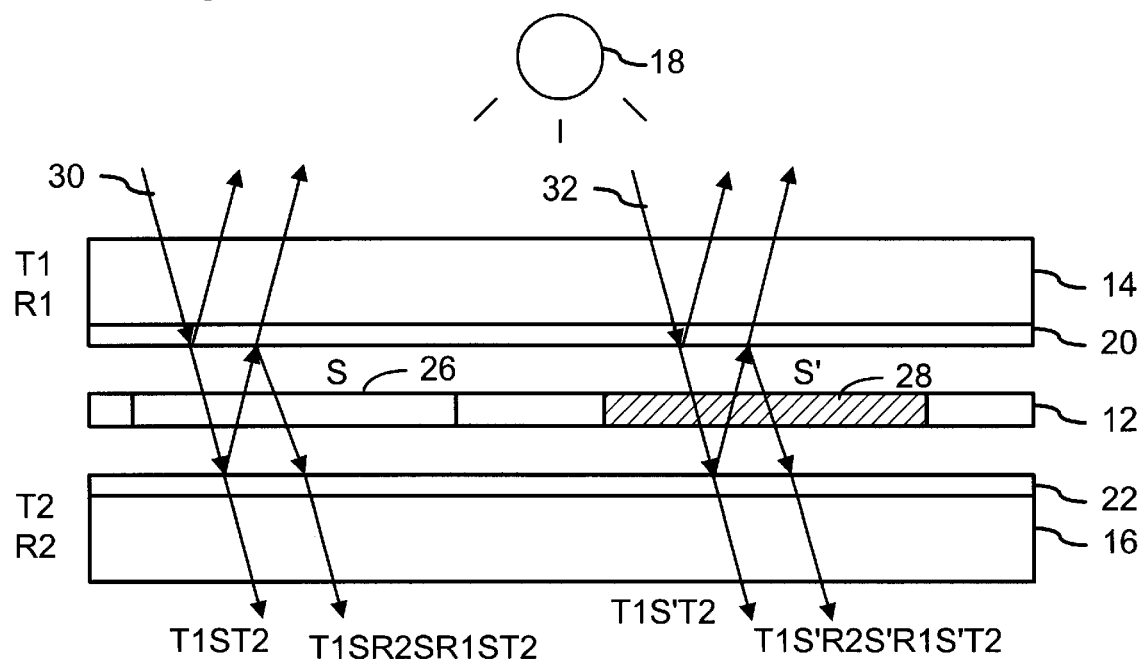
FIG. 2 is an exploded schematic sectional side view of the portion of the transmissive display system of FIG. 1 with an opaque pixel and a transmissive pixel to illustrate image contrast improvement provided by the present invention.

FIG. 2 is an exploded schematic sectional side view of a portion of a transmissive display system 10 showing an exemplary pair of pixels 26 and 28 having optical characteristics corresponding to transmissive and opaque optical states, respectively. It will be appreciated that in display system 10 as illustrated, light is transmitted through the liquid crystal material of liquid crystal display cell 12 for pixels in both the transmissive and opaque optical states. The different optical states are formed by cooperation between liquid crystal display cell 12 and polarizers 14 and 16. Improvements in image contrast according to the present invention are illustrated with reference to exemplary light beams 30 and 32 that are directed through respective transmissive and opaque pixels 26 and 28 and toward a display output 34.

As is known in the art, a transmissive optical system such as display system 10 may be characterized by the following equation:

$$T+R+A=1$$

in which T is the transmittance of the optical system, R is the reflectance, and A is the absorptance. This equation establishes that all light incident upon the transmissive optical system is either transmitted, reflected or absorbed. Moreover, image contrast may be represented by the equation:

$$C=(l-S)/(l+S)$$

in which l represents the resulting light or "signal" transmitted though transmissive pixel 26 and S represents the incidental resulting light or "noise" transmitted through opaque pixel 28.

In this illustration, polarizer 14 in combination with non-absorptive, high reflectance, low transmittance optical layer 20 is designated as having a transmittance T1 and a reflectance R1 and polarizer 16 in combination with non-absorptive, high reflectance, low transmittance optical layer 22 is designated as having a transmittance T2 and a reflectance R2. For purposes of illustration, pixels 26 and 28 are designated as having respective transmittances S and S'. Although illustrated as being localized in liquid crystal display cell 12, it will be appreciated that transmittances S and S' represent the net transmittances of pixels 26 and 28 through display system 10 rather than localized transmittance characteristics within liquid crystal display cell 12.

An effect of non-absorptive, high reflectance, low transmittance optical layers 20 and 22 is that successive portions of original incident light beams 30 and 32 undergo multiple reflections or passes between layers 20 and 22. Some light is transmitted toward display output 34 with each reflective pass. Two such passes are shown in FIG. 2 for each of pixels 26 and 28. With reference to pixel 26, for example, the resulting amount of light P transmitted for each of the first three successive passes may be represented as:

Pass 1: $P1=T1 \times S \times T2$

Pass 2: $P2=T1 \times S \times R2 \times S \times R1 \times S \times T2$

Pass 3: $P3=T1 \times S \times R2 \times S \times R1 \times S \times R2 \times S \times R1 \times S \times T2$ It will be appreciated that light from many more passes could affect the resulting total light transmitted. The resulting amount of light P' transmitted through pixel 28 for each pass would be represented by substantially identical equations, except that that the transmittance S' of pixel 28 would be substituted for the transmittance S of pixel 26. From this illustration, it can be discerned that the total light T and T' transmitted through pixels 26 and 28 can be represented by the following equations, respectively:

$$T = T1 \times S \times T2 \sum_{n=0}^{\infty} (R1 \times R2 \times S^2)^n$$

$$T' = T1 \times S' \times T2 \sum_{n=0}^{\infty} (R1 \times R2 \times S'^2)^n$$

As a result, the contrast ratio C between pixels 26 and 28, sometimes referred to herein as the image contrast, may be represented by the equation:

$$C=(T-T')/(T+T').$$

The contrast enhancement provided by non-absorptive, high reflectance, low transmittance optical layers 20 and 22 can thus be illustrated as follows. With a conventional prior art transmissive display system characterized by transmissive and opaque pixels having normalized respective transmittances S and S' of 1.0 and 0.9, the resulting contrast C is 0.0526.

In a first exemplary implementation of the present invention, non-absorptive, high reflectance, low transmittance optical layers 20 and 22 have respective transmittances T1 and T2 each of 0.15 (i.e., 15% transmittance). As a result, transmissive and opaque pixels 26 and 28 would have calculated respective transmittances T and T' of 0.0788 and 0.0487 and a resulting contrast C of 0.2363. This contrast C is about 4.49 times the contrast C of prior art transmissive display system. In a second exemplary implementation of the present invention, non-absorptive, high reflectance, low transmittance optical layers 20 and 22 have respective transmittances T1 and T2 each of 0.07 (i.e., 7% transmittance). As a result, transmissive and opaque pixels 26 and 28 would have calculated respective transmittances T and T' of 0.0289 and 0.0144 and a resulting contrast C of 0.3342. This contrast C is about 6.35 times the contrast C of prior art transmissive display system.

While non-absorptive, high reflectance, low transmittance optical layers 20 and 22 provide significant image contrast improvements, it will be appreciated that image transmittance is decreased. In the first and second implementations described above, the resulting transmittances T are about 7.9% and 2.9% of the normalized transmittance S of the prior art transmissive display system.

Conventionally, prior art transmissive display systems suffered from generally low transmittance and generally low intensity light sources. As a result, prior art transmissive display systems sought to maximize image brightness and would lead one away from adopting the relatively low transmittances provided by the present invention. However, the improved image contrast provided by the present invention, together with incremental improvements in transmissive display system transmittance and light source brightness, can provide significant improvements in image quality for many display applications, such as projection displays, microdisplays for wearable use and uses where maximum image fidelity and/or contrast are required.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

What is claimed is:

1. A transmissive display system, comprising:

a source of polychromatic light;

a controllable display cell through which the polychromatic light is transmitted and which imparts optical characteristics on the polychromatic light to form a display image; and a pair of generally non-absorptive, high reflectance, low transmittance optical layers positioned on opposite sides of the controllable display cell in face-to-face relation thereto, each of the optical layers including a multi-layer dielectric coating.

2. The display system of claim 1 in which the optical layers are positioned immediately adjacent the controllable display cell.

3. The display system of claim 1 in which the display cell includes a controllable liquid crystal material.

4. The display system of claim 1 in which each of the optical layers has an absorptance 5% or less.

5. The display system of claim 1 in which each of the optical layers has a reflectance of 90% or more.

6. The display system of claim 1 in which each of the optical layers has a transmittance of 10% or less.

7. A transmissive display system, comprising:

a source of polychromatic light;

a controllable display cell through which the polychromatic light is transmitted and which imparts optical characteristics on the polychromatic light to form a display image; and a pair of generally non-absorptive, high reflectance, low transmittance optical layers positioned immediately adjacent to opposite sides of the controllable display cell in face-to-face relation thereto, each of the optical layers including a multi-layer dielectric coating and having a reflectance of 90% or more.

8. The display system of claim 7 in which the display cell includes a controllable liquid crystal material.

9. In a transmissive display system having a controllable pixelated display cell through which light is transmitted and which imparts optical characteristics on the light to form a display image, the improvement comprising:

a pair of generally non-absorptive, high reflectance, low transmittance optical layers positioned on opposite sides of the controllable display cell in face-to-face relation thereto, each of the optical layers including a multi-layer dielectric coating and having a reflectance of 90% or more.

10. The display system of claim 9 in which the optical layers are positioned immediately adjacent the controllable display cell.

11. The display system of claim 9 in which the display cell includes a controllable liquid crystal material.

\* \* \* \* \*